United States Patent [19]

Macken

[11] 4,242,647
[45] Dec. 30, 1980

[54] STABILIZED VORTEX CONVECTIVE LASER

[76] Inventor: John A. Macken, 4039 Shadow Hill Dr., Santa Rosa, Calif. 95404

[21] Appl. No.: 955,491

[22] Filed: Oct. 27, 1978

[51] Int. Cl.³ .............................................. H01S 3/03
[52] U.S. Cl. ......................... 331/94.5 D; 331/94.5 G; 331/94.5 S
[58] Field of Search .................... 331/94.5 D, 94.5 G, 331/94.5 P, 94.5 E

[56] References Cited

U.S. PATENT DOCUMENTS 3,978,430  8/1976  Pierce et al. .................... 331/94.5 G

*Primary Examiner*—William L. Sikes
*Assistant Examiner*—Leon Scott, Jr.
*Attorney, Agent, or Firm*—Edward E. Roberts

[57] ABSTRACT

This invention relates to a method and apparatus for increasing the output power of certain lasers by inducing predictable vortex flow within the laser through the use of properly oriented fins.

7 Claims, 4 Drawing Figures

STABILIZED VORTEX CONVECTIVE LASER

BACKGROUND

1. Field of Invention.

This invention is directed, generally, to the field of laser devices and, in particular, to gas flow laser designs.

2. Prior Art.

The vast majority of commercial carbon dioxide ($CO_2$) lasers sold today are of the tube construction design since this approach is the easiest to build and has proven to be the most reliable. The tube construction design generally follows three basic approaches. The simplest and lowest power approach utilizes an electrical discharge in a water-cooled tube; this approach currently being used in most commercial $CO_2$ lasers. The power limitation of this approach is approximately 70 watts of output power per meter of discharge length. Another basic approach for constructing high power lasers consists of the so called "convective flow laser", wherein gas is circulated through an electrical discharge region wherein the electrical discharge excites the molecules, heating the gas and producing laser action. The laser gas is then pumped through a cooling section, where the waste heat is removed from the gas, after which the gas is recirculated into the electrical discharge region where the process is repeated. The convective flow lasers do not have a specific limitation as to power output per unit length, since this is dependent on variables such as gas flow speed, gas pressure, etc.

A third basic approach, generally referred to as "gas dynamic lasers", utilizes rocket engine technology. This approach will not be discussed further since it does not have application to the instant invention.

A basic tube type laser design has the advantages that the long, narrow discharge geometry allows good laser beam quality ($TEM_{00}$ modes) and the gas can flow through laser discharge at a slow flow rate. However, the major disadvantage of this type laser is the power limitation. Thus, an improvement in the power output of the basic tube type laser would have great commercial value, since it does not involve conversion of the existing designs to convective flow laser designs.

PRIOR ART STATEMENT

The most pertinent prior art known to applicant is applicant's copending application entitled "Spiral Flow Convective Laser" bearing Ser. No. 905,186, filed 5/12/78.

DESCRIPTION OF PREFERRED EMBODIMENTS

Figure 1:
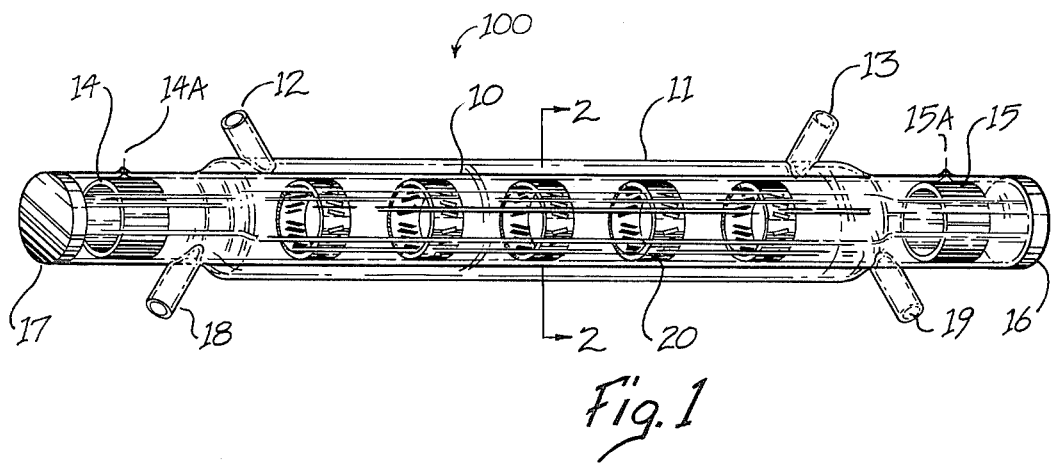
FIG. 1 is a persepctive view of a stabilized vortex convective laser.

Referring now to the drawings in detail, FIG. 1 shows a perspective view of the stabilized vortex convective laser 100 wherein cooling tube 10 is a glass tube which runs the length of the laser. Concentric glass tube 11 acts as a water jacket for cooling tube 10. Operationally, water enters the region between tubes 10 and 11 through port 12, and exits through port 13. Gas discharge electrodes 14 and 15 are placed at either end of the laser tube 10. These electrodes are, typically, hollow metal cylinders connected by wires 14a and 15a through a vacuum-tight seal to an external power source (not shown). Laser reflector 16 is a totally reflecting mirror and laser reflector 17 is a partially transparent reflector. Reflectors 16 and 17 are aligned both to the axis of the tube 10 and to each other within the required tolerances known to those skilled in the art. The reflecting surfaces of reflectors 16 and 17 can be either spherical or flat. Those skilled in the art are familiar with the criteria for determining both the curvature and the reflectivities of these reflectors. Gas inlet port 19 passes the laser gas, preferably a mixture of carbon dioxide, nitrogen and helium, into tube 10. Gas exhaust port 18 serves as the exit passage from tube 10 for the laser gas mixture. Coiled metal rings 20 (shown in more detail in the following figures) are springy metal rings which make close contact with the inside wall of tube 10. Fin sections 29 (FIG. 3) protrude into the center of tube 10 from the fin rings 20. In this embodiment, five fin rings 20 are illustrated. However, the actual number of these rings is a function of the desired characteristics of the respective lasers.

Figure 2:
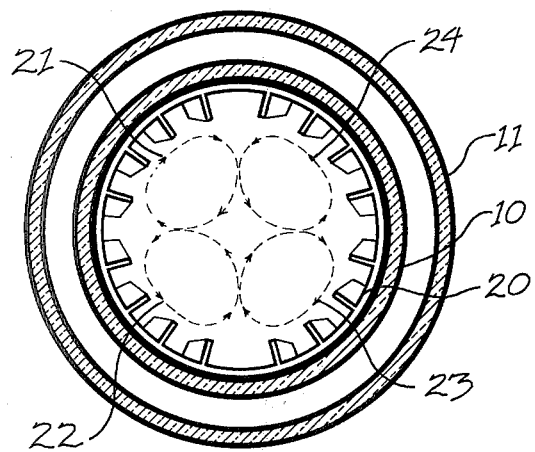
FIG. 2 is a cross-sectional view taken along lines 2—2 of the embodiment shown in FIG. 1 including the gas flow patterns.

FIG. 2 is a cross-sectional view taken along line 2—2 of the embodiment shown in FIG. 1. In FIG. 2, the concentric relationship of water jacket tube 11 and inner glass tube 10 is shown. Normally, water (or other suitable coolant) flows between tubes 10 and 11. An end view of the springy metal rings 20 illustrates the close, intimate contact between the rings and the inner surface of tube 10. The gas vortices which are generated in the flowing laser gas are illustrated by dashed lines 21, 22, 23 and 24. These vortices will be explained in detail later.

Figure 3:
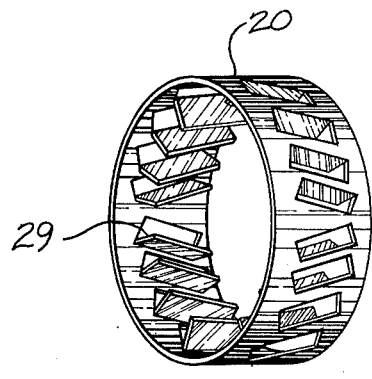
FIG. 3 is a perspective view of a vortex generating fin.
Figure 4:
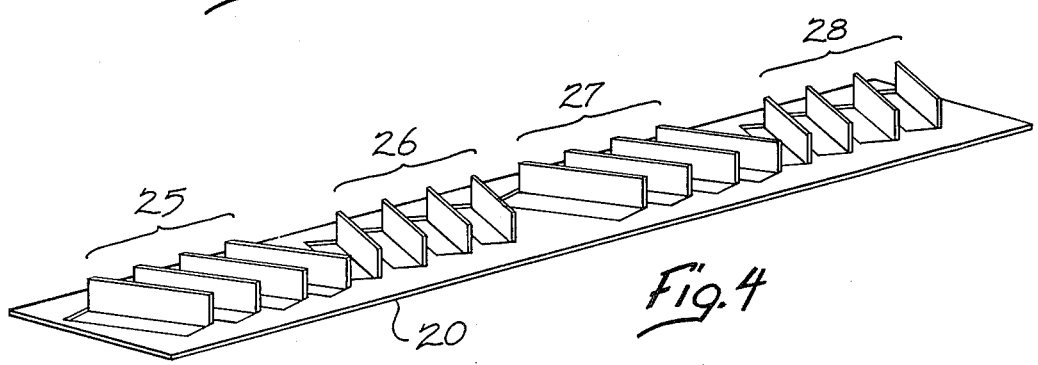
FIG. 4 is a perspective view of a blank for a vortex generating fin before it is bent into a circle.

FIG. 3 is a perspective view of a typical fin ring 20. Fins 29 are portions of the basic metal strip used in making coil 20 which portions are cut and bent at approximately 90 degrees to the metal strip. FIG. 4 shows how fin ring 20 appears when laid out flat. It can be seen that there are four groups 25, 26, 27, 28 of fins 29 which are oriented at different angles relative to the length of the strip. These fins are formed by making a series of "U"-shaped cuts in the metal strip 20 and then bending up each tab as shown in FIG. 4. The thin metal strip 20 can easily be bent into the ring shape shown in FIG. 3. This ring tends to return to the flat configuration again whereby it is held tightly against the glass tube wall when coil 20 is inserted into tube 10 as shown in FIG. 2.

The operation of this invention can be best conveyed by describing an experimental laser which was operated to test this principle. This laser had a distance of six feet between electrodes 14 and 15, as shown in FIG. 1. Tube 10 had an internal diameter of about 1.1 inches, and tube 11 had an internal diameter of about 1.4 inches. The strips 20 shown in FIG. 4 were made of 0.005 inch half hard brass with an overall length of about 3.45 inches and a width of about 0.375 inches. The fin groups 25, 26, 27 and 28 were made by chemically etching "U"-shaped thin lines into the brass 20 strip to form flaps or tab areas.

The flap areas which remained were then bent up perpendicular to the surface of 20, as shown in FIG. 4.

The individual fins were 0.08 inches high, 0.12 inches wide, and made a 45 degree angle with the edge of the brass. The fins in groups 25 and 27 are all parallel to each other and form a 45 degree angle with the long edge of brass strip 20. The fins in groups 26 and 28 are also parallel to each other and form a 90 degree angle relative to the orientation of the fins in groups 25 and 27. Brass strip 20 was then coiled into a ring, as shown in FIG. 3, and inserted into the laser tube, as shown in FIG. 1. The fin rings were all properly oriented so that each of the fin segments had the same orientation. That is, all groups 25, 26, 27 and 28 were aligned with each other in a straight line parallel to the tube axis. The fin rings were spaced about two inches apart. Therefore there were more rings in the actual laser than are shown in FIG. 1.

A mixture of carbon dioxide, nitrogen and helium gas was then introduced through port 19 and exhausted through port 18 at the rate of about 120 cubic feet per minute, at a total pressure of 20 torr. A power supply (not shown) was connected to electrodes 14 and 15, so that a current of about 250 milliamps was passed through the laser gas mixture. Also, cooling water was passed into port 12 and exhausted through port 13 at the rate of about 5 gallons per minute. Under these conditions, a laser beam of about 420 watts was obtained through output coupler 17. This output power is an improvement of about a factor of $3\frac{1}{2}$ over the normal output power which would be expected from a typical tube-type laser which did not contain the fin ring segments.

The theory behind this improvement in output power is based on the fact that carbon dioxide lasers are limited by the ability of extracting heat from the laser gas. In a normal tube-type laser, this heat extraction is limited by the thermal conductivity of the laser gas mixture. Since the laser gas is at a low pressure and also has a low average atomic weight, it is not practical with acceptable pressure drops to reach a condition where turbulent flow can take place. Turbulent flow is the condition where random eddies cause rapid mixing of the gas, and thereby increase the heat transfer rate over what would normally be expected for laminar flow. The fin rings 20 are oriented so that gas flowing through the laser tube is redirected by the fin groups and broken up into four stable counterrotating vortices, as shown in FIG. 2. These vortices are stable, unlike turbulent flow, and they are optimized for transferring gas from the center of the tube where it is heated to the walls of tube where it can be cooled. Also, the four-vortex condition shown in FIG. 2 is the optimum condition for stabilizing the electrical discharge. That is, normally, the electrical discharge is deflected by any transverse gas flow. While the four-vortex flow shown in FIG. 2 also slightly deflects the gas discharge, it does not cause it to become unstable or to move away from the center of the tube. It is also to be expected that further increases in the output power per unit length are possible by optimizing the fin size, the fin angle, and the spacing of the rings within the laser tube. Also, it is to be understood that while fin configurations which generate four vortices produce the optimum heat transfer condition, it is also possible to produce some improvement over a tube with no fins by using fins oriented to generate either two or six vortices. It will be obvious to those skilled in the art that it is possible to modify the fin angles and groupings to produce either two or six vortices following the teachings of the present application.

Thus, there is shown and described a preferred embodiment of the instant invention. As noted, modifications may be conceived by those skilled in the art. However, any modifications which fall within the preview of this description are intended to be included as well. The description is intended to be illustrative only. The scope of the invention is limited only by the claims appended hereto.

Having thus described a preferred embodiment of the invention, what is claimed is:

1. In a convective gas laser including gas discharge tube means for supplying a lasing gas and means for producing an electrical discharge through said gas, the improvement comprising;
   at least one fin ring disposed in said tube concentrically about the longitudinal axis of said tube and to the flow of said gas,
   said fin ring including at least two adjacent groups of upstanding fins which project into the interior of said tube,
   adjacent ones of said groups of upstanding fins oriented relative to each other and to said ring thereby to each produce a circumferential deflection angle to said laser gas as it flows through said tube.

2. The convective laser recited in claim 1, wherein, said fin ring is disposed in intimate contact with the inner surface of said tube.

3. The convective laser recited in claim 1, wherein, said fin ring is formed of a resilient metal.

4. The convective laser recited in claim 1, wherein, a plurality of fin rings are disposed in said tube with the groups of upstanding fins of each fin ring being aligned with each other along the length of said tube.

5. The convective laser recited in claim 1, wherein, adjacent groups of upstanding fins are oriented substantially 90 degrees relative to each other and substantially 45 degrees relative to the length of said fin ring thereby having opposite deflection angular orientations to produce stable counter rotating vortices in said laser gas as it flows through said tube.

6. The convective laser recited in claim 5, wherein, alternate groups of upstanding fins have substantially the same or parallel orientation.

7. The convective laser recited in claim 1, wherein:
   said fin ring comprises an even number of substantially equal size fin groups, each of said fin groups being oriented to produce a circumferential deflection angle between 25 degrees and 55 degrees to gas flowing parallel to the axis of said tube;
   adjacent ones of said fin groups being oriented substantially 90 degrees relative to each other and having opposite deflection angles; and
   alternate ones of said fin groups being oriented substantially parallel to each other.

* * * * *